United States Patent [19]

Niederman et al.

[11] Patent Number: 5,636,858
[45] Date of Patent: Jun. 10, 1997

[54] AIR BAG MODULE

[75] Inventors: Robert R. Niederman, Dayton; Steven W. Stukenborg, Centerville, both of Ohio

[73] Assignee: General Motors Corporation, Detroit, Mich.

[21] Appl. No.: 435,600

[22] Filed: May 5, 1995

[51] Int. Cl.$^6$ .................................................. B60R 21/16
[52] U.S. Cl. .......................................... 280/728.2; 280/731
[58] Field of Search ........................... 280/728.2, 728.3, 280/731; 411/347, 352

[56] References Cited

U.S. PATENT DOCUMENTS

| | | |
|---|---|---|
| 5,087,069 | 2/1992 | Corbett et al. . |
| 5,207,544 | 5/1993 | Yamamoto et al. ................ 280/728.2 |
| 5,259,641 | 11/1993 | Schenk et al. . |
| 5,333,897 | 8/1994 | Landis et al. . |
| 5,350,190 | 9/1994 | Szigethy ............................ 280/728.2 |
| 5,380,037 | 1/1995 | Worrell et al. . |
| 5,409,256 | 4/1995 | Gordon et al. . |
| 5,470,099 | 11/1995 | Williams ............................ 280/728.2 |
| 5,470,100 | 11/1995 | Gordon .............................. 280/728.2 |
| 5,505,488 | 4/1996 | Allard ................................ 280/728.2 |

*Primary Examiner*—Paul N. Dickson
*Attorney, Agent, or Firm*—Kathryn A. Marra

[57] ABSTRACT

An air bag module includes an axially elongated first mounting member having an upper portion mounted to an air bag retainer and having a rearwardly extending portion extending through an air bag and an inflator flange. In addition, the module includes an axially elongated second mounting member having an internal axial bore therethrough for securely engaging the rearwardly extending portion of the first mounting member therein. The second mounting member securely traps the air bag and inflator flange when the second mounting member is fully engaged with the first mounting member. The second mounting member also is adapted for mounting the module to support portion of the vehicle.

8 Claims, 4 Drawing Sheets

AIR BAG MODULE

This invention relates to an air bag module mounted to a vehicle, and more particularly to a mechanism for retaining the components of the module and for mounting the module.

BACKGROUND OF THE INVENTION

It is well known in motor vehicles to provide an air bag module mounted to a vehicle. For example, a typical driver's side air bag module includes a generally circular inflator positioned partially within a bag opening of an air bag for discharging inflator gas to inflate the air bag upon sensing certain predetermined vehicle conditions. The undeployed air bag is folded atop the inflator and a module cover overlies the air bag, inflator and other module components. The cover commonly has tear lines or weakened portions that allow the cover to open during air bag inflation.

Typically, the inflator includes a main body portion which discharges gas and an outwardly extending inflator mounting flange. The module also includes an air bag retainer located within the bag opening of the air bag and including a central gas opening for receiving the inflator therethrough. It is also typical to connect the air bag retainer to the air bag by a first fastening mechanism, to connect the air bag retainer to the base plate by a second fastening mechanism, and to connect the inflator to the base plate by a third fastening mechanism. The air bag retainer, air bag, inflator, and cover are each connected to the base plate to form the air bag module. Typically, the first, second, and third fastening mechanisms are each composed of one or more parts.

In addition, the module typically includes a plurality of axially elongated mounting members mounted to the base plate to connect the module to a hub portion of a steering wheel. Since the module perimeter is typically wider than a perimeter of the steering column of a steering wheel assembly, the mounting members on the base plate are located outboard of the perimeter of the steering column such that access holes can be provided in the hub portion directly beneath the mounting members for rear release of the mounting members for disconnection of the module from the steering wheel.

Reduction in inflator size has enabled modules which have an outer perimeter smaller than an outer perimeter of the steering column. Thus, there is no longer plentiful room around the air bag opening to attach the multiplicity of fasteners that are required to independently connect all of the module components to each other. If mounting members are provided on the module, they will be located inboard of the outer perimeter of the steering column such that the mounting members are no longer accessible by access holes in the hub portion for rear release. In addition, the prior art multiplicity of fastening mechanisms required to retain the module components to each other along with the mounting members required to mount the module to the steering wheel greatly increases assembly time.

SUMMARY OF THE INVENTION

Thus, the present invention provides a module having mounting members which both retain the components of the air bag module and which also mount the module to the vehicle. Advantageously, the present invention simplifies the module by significantly reducing the number of fastening components in the module, thus reducing the assembly time. The present invention preferably enables easy snap-fitted attachment of the module to the vehicle using the same mechanism that retains the components. A preferred form of the invention also enables easy removal of the module from the vehicle by permitting rear release of the module at a location outboard of the perimeter of the module when the rear of the module is inaccessible.

These advantages are accomplished in the present invention by providing an air bag module mounted to a support portion of a vehicle. The module includes an air bag having an air bag opening and an air bag retainer positioned around the air bag opening. The module also includes an inflator for discharging gas into the air bag opening to inflate the air bag. The inflator includes an outwardly extending inflator flange. The module further includes an axially elongated first mounting member having an upper portion mounted to the air bag retainer and having a rearwardly extending portion extending through the air bag and the inflator flange. In addition, the module includes an axially elongated second mounting member having an internal axial bore therethrough for securely engaging the rearwardly extending portion of the first mounting member therein. The second mounting member has a retaining surface extending radially outward from the bore and abutting the inflator flange when the first mounting member is fully engaged within the second mounting member. Thus, the air bag and inflator flange are securely trapped between the retaining surface and the air bag retainer when the second mounting member is fully engaged with the first mounting member. Advantageously, the second mounting member also has a distal end opposite the retaining surface and adapted for connection to the support portion of the vehicle to hold the module in position relative the vehicle.

In a preferred form of the invention, the module includes an outer module perimeter and a rear side being inaccessible when the module is mounted to the support portion of the vehicle. In addition, the support portion includes a resilient member on the support portion for holding the distal end of the second mounting member in position relative the support portion. The resilient member includes a latching portion located inboard the module perimeter and adapted for snap-fitted engagement with the distal end. The resilient member also includes a release portion for releasing the distal end and located outboard of the module perimeter whereby the distal end of the second mounting member is releasable rearward of the module despite inaccessibility of the rear side of the module.

Thus, the present invention is characterized by providing simplicity, ease of assembly and disassembly, and reduction of parts and assembly time for retaining the components of the module to each other and for mounting the module to the vehicle.

BRIEF DESCRIPTION OF THE DRAWINGS

An embodiment of the present invention is described below, by way of example only, with reference to the accompanying drawings in which.

DESCRIPTION OF THE PREFERRED EMBODIMENT

Figure 1:
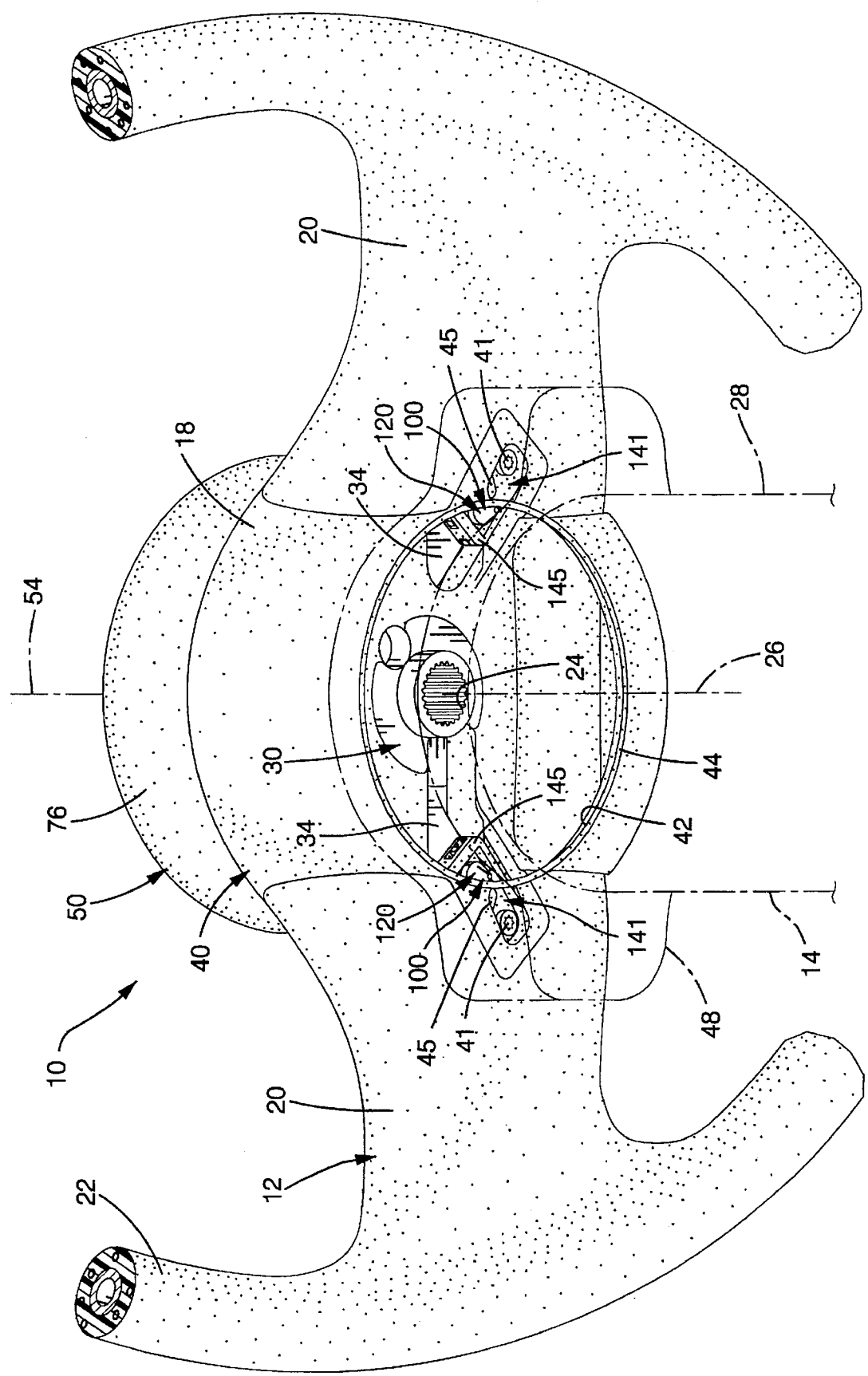
FIG. 1 is a perspective view of a steering wheel assembly partially-broken-away and showing a shroud and a steering column in phantom lines.
Figure 4:
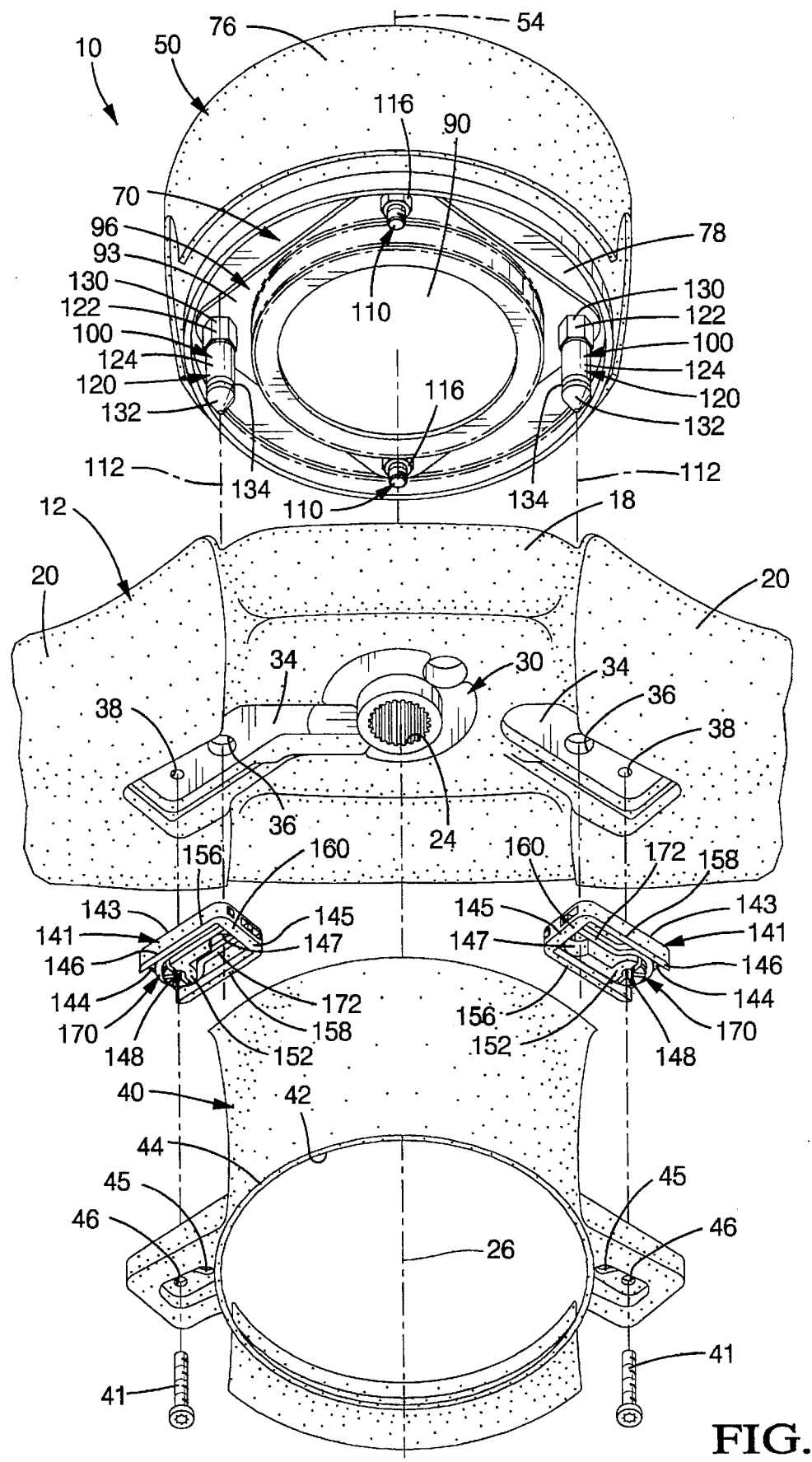
FIG. 4 is a partially-exploded perspective view of the steering wheel assembly.

Referring to FIGS. 1 and 4, a vehicle includes a steering wheel assembly, generally designated as 10, including a steering wheel 12 mounted on a steering column 14 and an air bag module 50 mounted on the steering wheel 12. The steering wheel 12 includes a support plate portion 30 molded into a central hub portion 18 and outwardly extending spoke portions 20. An outer circular rim portion 22 is connected to the central hub portion 18 by the spoke portions 20. The air bag module 50 is mounted on the support portion 30 of the steering wheel 12.

Figure 2:
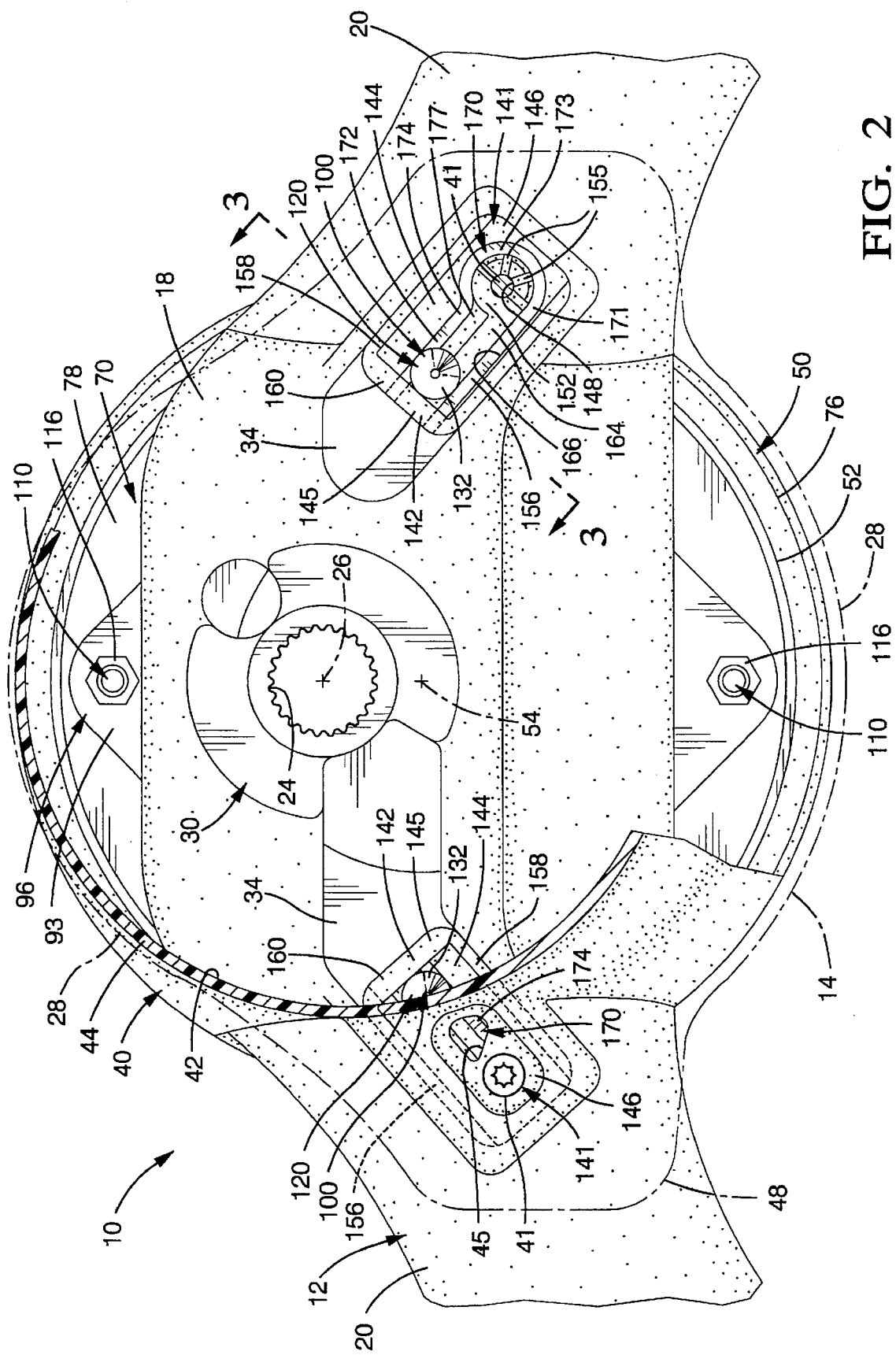
FIG. 2 is a bottom view of the steering wheel assembly partially-broken-away with a hub cover partially-broken-away.

The steering wheel 12 has a central splined opening 24 defining a central longitudinal steering axis 26 of the steering wheel assembly 10 and for mounting to a splined shaft (not shown) of the steering column 14. The steering column 14 has an outer column diameter 28 preferably greater than or equal to an outer module diameter 52 of the air bag module 50, as best shown in FIG. 2. The air bag module 50 has a central longitudinal module axis 54 parallel to but offset from the central steering axis 26 when the module 50 is mounted on the steering wheel 12. For purposes of this description, forward and rearward directions are defined along the longitudinal module axis 54. A radial direction is normal to the longitudinal direction, a radially inboard direction is defined as being towards the central module axis 54, and a radially outboard direction is defined as being away from the central module axis 54. A lateral direction is defined normal to the longitudinal and radial directions.

Preferably, the steering wheel assembly 10 is designed such that the steering wheel 12 cannot rotate relative the steering column 14 without using an ignition key (not shown) for theft deterfence purposes, as described further hereinafter.

The generally planar support portion 30 is preferably a metal plate molded into the hub portion 18 of the steering wheel 12. The support portion 30 includes a front side 32 and an opposite rear side 34. The support portion 30 includes a plurality of support apertures 36 located on the central hub portion 18 and inboard the outer column diameter 28 of the steering column 14. The number of support apertures 36 is preferably equal to the number of spoke portions 20 of the steering wheel 12. Although the preferred embodiment shows two spoke portions 20, more are possible.

The support portion 30 further includes a plurality of fastener apertures 38 each located on respective spoke portions 20 and each being spaced apart outboard from respective support apertures 36 and also located outboard of the outer column diameter 28 of the steering column 14, thus permitting rear access to the fastener apertures 38, as will be described further hereinafter.

As best shown in FIG. 4, the steering wheel assembly 10 further includes a hub cover 40 preferably formed from a plastic material. The hub cover 40 includes a central hub cover opening 42 having a rim 44 preferably sized for interfacing with the steering column 14. The hub cover 40 includes hub cover apertures 46 matably aligned with the fastener apertures 38 in the support portion 30 when mounted thereto. The hub cover 40 is secured to the rear side 34 of the support portion 30 by the use of hub cover fasteners 41, such as screws. The hub cover 40 further includes access openings 45 positioned outboard the outer column diameter 28 and the outer module diameter 52 and spaced inboard from the fastener apertures 38 to assist with rear release of the air bag module 50 from the support portion 30, as described further hereinafter.

The steering column 14 further includes a shroud 48 shown in phantom lines in FIGS. 1 and 2 and located rearward the support portion 30. The shroud 48 is preferably a heavy plastic material which surrounds and extends radially outward from the steering 14 column of the vehicle and remains fixed relative the steering column 14 when the steering wheel 12 is rotated. The shroud 48 preferably has a generally rectangular shape and is sized and shaped to always block rearward access to at least one of the access openings 45 of the hub cover 40 regardless of the rotational position of the steering wheel 12. Thus, the shroud 48 deters theft of the module 50 since the module 50 can only be removed from the steering wheel 12 by successively accessing all of the access openings 45 of the hub cover 40, as described further hereinafter.

Figure 3:
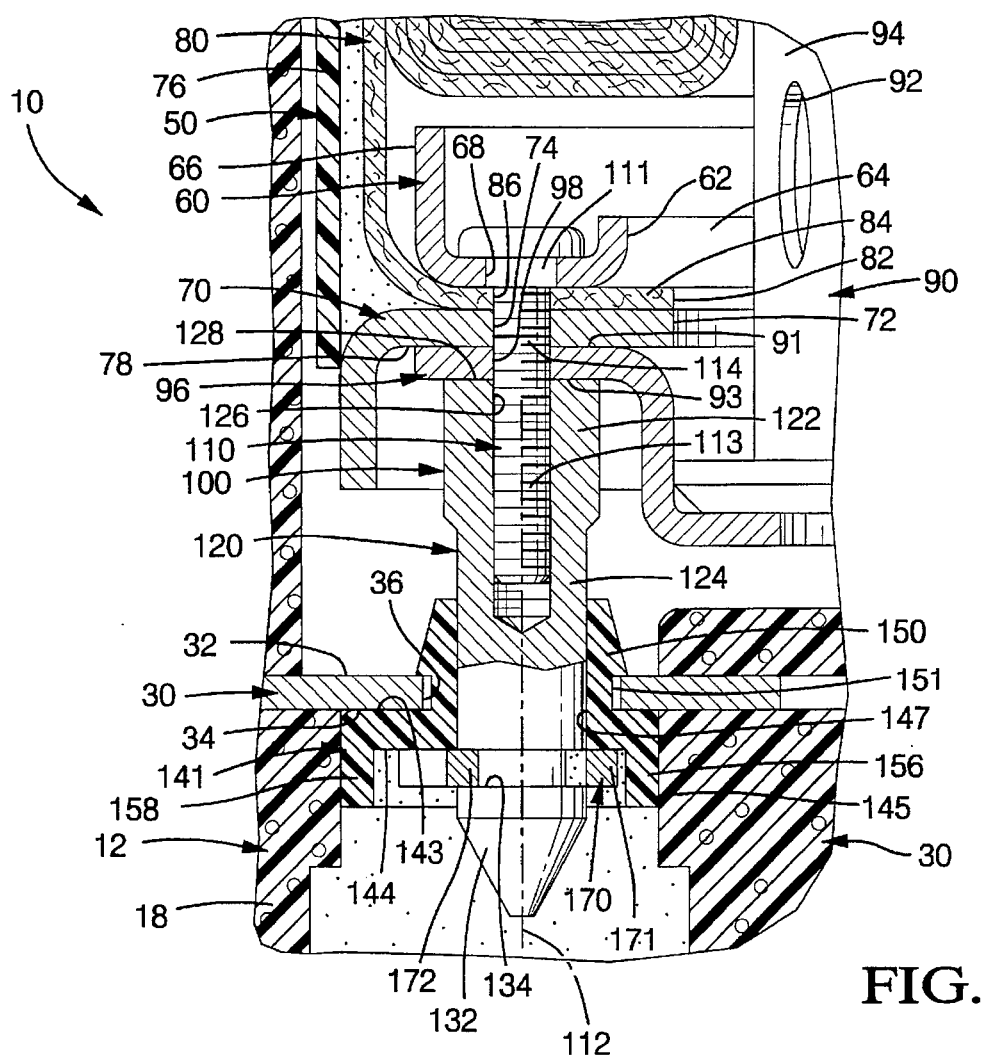
FIG. 3 is a view taken along line 3—3 of FIG. 2.

Referring to FIGS. 3 and 4, the component parts of the air bag module 50 include a base plate 70, an air bag retainer 60, an air bag 80, an inflator 90, and fastener mechanisms 100 for retaining and mounting the module 50 including first and second mounting members 110, 120, respectively. The air bag 80, inflator 90, and base plate 70 are each simultaneously modularized to the air bag retainer 60 and each other and then mounted to the steering wheel 12 by cooperation of the first and second mounting members 110, 120 of the mechanisms 100, as will be further described in detail. In contrast, the components of prior art modules have components each modularized to the base plate by many sets of fastening mechanisms which are each comprised of one or more pieces.

As best shown in FIG. 3, the air bag 80 may be of a conventional construction and material. The air bag 80 includes an air bag opening 82 for receiving inflator 90 gas therein to inflate the air bag 80. A circumferential mouth portion 84 of the air bag 80 surrounds the air bag opening 82. The mouth portion 84 includes a plurality of air bag apertures 86 which are circumferentially spaced apart around the mouth portion 84 of the air bag 80.

An air bag retainer 60 is located within the air bag 80 adjacent and atop the mouth portion 84 for adding support to the mouth portion 84 of the air bag 80 during inflation when connected thereto. The air bag retainer 60 is preferably metallic and includes an inner diameter 62 defining a central gas opening 64 for receiving the inflator 90 partially therethrough. Preferably, an outer retainer diameter 66 of the air bag retainer 60 is smaller than or equal to an outer column diameter 28 of the steering column 14. The air bag retainer 60 includes a plurality of air bag retainer apertures 68 circumferentially spaced for alignment with the air bag apertures 86.

Referring to FIG. 3, the module 50 includes the inflator 90 for generating gas to inflate the air bag 80 when the inflator 90 receives a predetermined signal from a vehicle sensor, not shown. The inflator 90 has a generally circular shape and may be of a conventional construction for discharging gas such as through ports 92 in a main body 94 to inflate the air bag 80. The main body 94 of the inflator 90 is located partially within the air bag opening 82 and partially extends through the central gas opening 64 of the air bag retainer 60. The inflator 90 further includes a peripheral radially outwardly extending inflator flange 96 which may be integral with the inflator 90 or attached to the main body 94, such as by welding or fastening. The inflator flange 96 includes a plurality of inflator flange apertures 98 circumferentially spaced for axial alignment with the air bag apertures 86 and the air bag retainer apertures 68. The inflator flange 96 has a front flange face 91 and an opposite rear flange face 93.

Referring to FIGS. 1 and 2, the base plate 70 is preferably metallic and includes a central circular plate opening 72 sized slightly larger than the main body 94 of the inflator 90 and sized for alignment with the central gas opening 64 of the air bag retainer 60. The base plate 70 includes a plurality of base plate apertures 74 spaced for alignment with respective air bag apertures 86, air bag retainer apertures 68, and inflator flange apertures 98.

Referring to FIG. 1, the module 50 may also include a cover 76 which is preferably molded from a suitable polymeric or elastomeric material and suitably mounted to the module 50, such as by fastening to the base plate 70. The cover 76 preferably includes tear lines or weakened portions that allow the cover 76 to open during air bag 80 inflation.

As best shown in FIG. 3, the fastener mechanisms 100 for modularizing the components of the air bag module 50 to the air bag retainer 60 and relative each other and for mounting the module 50 to the steering wheel 12 includes the plurality of first mounting members 110 rigidly connected to the air bag retainer 60 and the plurality of second mounting members 120 threadably engaging the first mounting members 110. The first and second mounting members 110,120 are preferably positioned inboard the outer column diameter 28 of the steering column 14 and enable facile assembly and disassembly of the air bag retainer 60, air bag 80, base plate 70 and inflator 90 to each other and facile assembly and disassembly of the module 50 with the support portion 30 of the steering wheel 12. An axial axis 112 of the mechanisms 100 corresponds to the longitudinal direction on the module 50.

As best shown in FIG. 3, the plurality of axially elongated annular first mounting members 110 each have an upper head portion 111 rigidly mounted to the air bag retainer 60, such as by press-fitting, such that movement of the first mounting members 110 relative the air bag retainer 60 is prevented. The first mounting members 110 each include a threaded shank portion 113 extending rearwardly from each head portion 111. Upper sections 114 of the threaded shank portions 113 extend through respective air bag apertures 86, air bag retainer apertures 68, base plate apertures 74 and inflator flange apertures 98 which are matably aligned for receiving the threaded shank portions 113 therethrough during module 50 assembly. In the preferred embodiment, four such first mounting members 110 are spaced equally apart around the air bag retainer 60.

The threaded shank portions 113 of the first mounting members 110 each extend rearwardly towards the support portion 30 of the steering wheel 12. However, the first mounting members 110 are located inboard the outer column diameter 28 and thus are not accessible from the rear side 34 of the support portion 30 when the steering wheel 12 is assembled to the steering column 14.

As best shown in FIG. 3, the plurality of axially elongated annular second mounting members 120 each have an upper portion 122 adapted for releasable connection to the first mounting members 110 and a lower portion 124 adapted for releasable connection to the support portion 30 for mounting the module 50 to the steering wheel 12 of the vehicle. The second mounting members 120 are each preferably formed from a single piece of metallic material. The upper portions 122 of the second mounting members 120 each have an internally threaded axial bore 126 extending partially therethrough and for threadably engaging the respective threaded shank portions 113 of the first mounting members 110 to securely connect the first mounting members 110 to the second mounting members 120.

The second mounting members 120 each further include a retaining surface 128 extending radially outward from an upper end of the axial bore 126 and directly abutting the rear flange face 93 of the inflator flange 96 when the second mounting members 120 are fully threadably engaged with the first mounting members 110. The upper portions 122 of the second mounting members 120 each preferably have a radially outwardly projecting noncircular-shaped gripping portion 130 for mating with a tool, such as a wrench, to enable easy assembly and disassembly of the second mounting members 120 from the first mounting members 110.

The lower portions 124 of the second mounting members 120 extend rearwardly towards the support portion 30 of the steering wheel 12 and include tapered distal ends 132 having an annular groove 134 thereon. In the preferred embodiment, two such second mounting members 120 are shown corresponding to the number of spoke portions 20 and support apertures 36 in the support portion 30. The distal ends 132 of the second mounting members 120 are spaced for matable alignment with the support apertures 36 for insertion therethrough to securely connect the module 50 to the support portion 30, as described below. The second mounting members 120, as well as the first mounting members 110, are located inboard of the outer column diameter 28 and thus are not accessible from the rear side 34 of the support portion 30 when the steering wheel 12 is assembled to the steering column 14.

Referring to FIG. 4, the additional first mounting members 110 which are not located adjacent the spoke portions 20 of the steering wheel 12 and thus are not attached to second mounting members 120, may be preferably provided to prevent inflator 90 gas from escaping out through the air bag opening 82 during air bag 80 inflation. These additional first mounting members 110 may be secured to the module 50, such as by nuts 116 or snap attachment.

Referring to FIGS. 3 and 4, the module 50 is preferably assembled as follows. First, the entire air bag retainer 60 including the first mounting members 110 rigidly attached thereto are inserted into the air bag opening 82. The first mounting members 110 are aligned with respective air bag apertures 86 and inserted therethrough. Next, the base plate apertures 74 are aligned with the threaded shank portions 113 of the first mounting members 110 and the first mounting members 110 are inserted through the base plate apertures 74 such that the air bag 80 and air bag retainer 60 are loosely attached to the base plate 70, but are still capable of longitudinal movement relative each other.

Prior to assembly of the cover 76 and the inflator 90 to the module 50, the air bag 80 is folded. As described above, the first mounting members 110 loosely attach the air bag 80, air bag retainer 60 and base plate 70 together such that the base plate 70 may be temporarily mounted to a machine to hold the air bag 80, air bag retainer 60 and base plate 70 relative each other while folding the air bag 80. Once the air bag 80 is in the folded condition, the cover 76 may be assembled to the base plate 70 in a suitable manner to maintain the air bag 80 in the folded condition.

Next, the inflator flange apertures 98 are matably aligned with the air bag apertures 86, air bag retainer apertures 68, base plate apertures 74 and the first mounting members 110 such that the inflator 90 may be dropped into the rear of the module 50 such that the main body 94 of the inflator 90 extends partially through the plate opening 72 of the base plate 70 and the gas opening 64 of the air bag retainer 60. Thus, the first mounting members 110 extend through the inflator flange apertures 98 and the front flange face 91 abuts a rear face 78 of the base plate 70.

Finally, the axial bores 126 of the second mounting members 120 are aligned with respective threaded shank portions 113 of the first mounting members 110 and the second mounting members 120 are each simply screwed on to the first mounting members 110 until the retaining surfaces 128 of the second mounting members 120 abut the rear flange faces 93 of the inflator flange 96.

In the assembled condition, it will be appreciated that the single step of connecting the second mounting members 120 to the first mounting members 110 securely traps the mouth portion 84 of the air bag 80, the base plate 70, and the inflator flange 96 between the air bag retainer 60 and the retaining surfaces 128 of the second mounting members 120 to securely connect the air bag 80, base plate 70, and inflator 90 to the air bag retainer 60. Thus, simply by attachment of the second mounting members 120 to the first mounting members 110 the air bag 80, air bag retainer 60, base plate 70, and inflator 90 are simultaneously securely connected to each other and fixed relative each other by the second mounting members 120 which are then also advantageously used to snap-fittedly connect the entire module 50 to the vehicle.

Thus, the use of the fastener mechanisms 100 having a plurality of first and second mounting members 110,120 which simultaneously connect and cooperatively retain the air bag 80, air bag retainer 60, base plate 70, and inflator 90 together to form the module 50, advantageously eliminates the numerous sets of fasteners required in the prior art to form an air bag module by several individual connections of components. In addition, the rearwardly extending second mounting members 120 are advantageously easily accessible from the rear of the module 50, when not assembled to the steering wheel 12, as shown in FIG. 4, such that the components of the module 50 may be easily simultaneously disassembled from each other by unscrewing the second mounting members 120 from the first mounting members 110 by use of a suitable tool as enabled by the noncircular-shaped gripping portion 130.

As an alternative, especially when the air bag 80 is folded manually, the second mounting members 120 may be temporarily threadably engaged onto the first mounting members 110 to hold the air bag 80, air bag retainer 60 and base plate 70 securely together while the air bag 80 is being folded. It is desirable for the inflator 90 to be the last component assembled to the module 50 for safety in handling. Advantageously, an air bag module subassembly including the air bag 80, air bag retainer 60, base plate 70, cover 76, and first and second mounting members 110, 120 provides a securely retained module subassembly which may be shipped to a vehicle assembly location without the inflator 90. At the vehicle assembly location, the second mounting members 120 may be unscrewed from the first mounting members 110 and the inflator 90 dropped into the module 50 after which the second mounting members 120 can again be connected to the first mounting members 110 to complete the module 50 for attachment to the vehicle.

It will be appreciated that the support apertures 36 of the support portion 30 correspond in number and location to the second mounting members 120, such that the support apertures 36 are disposed to receive the distal ends 132 of second mounting members 120 therethrough.

Spring housings 141, preferably formed of a plastic material, are mounted to the rear side 34 of the support portion 30. The spring housings 141 each include a generally planar front surface 143 facing and parallel to the rear side 34 of the support portion 30 and an opposite generally planar rear surface 144. The spring housings 141 each include a first portion 145 located inboard the outer column diameter 28 and the outer module diameter 52 and a second portion 146 located outboard the outer column diameter 28 and the outer module diameter 52. The first portions 145 of the spring housings 141 each include a first aperture 147 for matable alignment with respective support apertures 36 and thus are located inboard of the outer column diameter 28. The second portions 146 of the spring housings 141 each include a second aperture 148 for alignment with respective fastener apertures 38 in the support portion 30 for receiving the hub cover fasteners 41 therein and located outboard of the outer column diameter 28.

The spring housings 141 each include a first integral cylindrical projection 150 through which the first apertures 147 extend. The first projections 150 extend longitudinally forward away from the front surfaces 143 of the spring housings 141 and up through respective support apertures 36 to hold the spring housings 141 in position on the support portion 30. The spring housings 141 are easily connected to the rear side 34 of the support portion 30 by pushing the first projection 150 through the support apertures 36 until the support portion 30 snap-fittedly engages with a first annular slot 151 on the first projection 150, as shown in FIG. 3.

As best shown in FIG. 4, the second apertures 148 are matably aligned with the hub cover apertures 46 and the fastener apertures 38 for receiving the hub cover fasteners 41 therethrough. The spring housings 141 each further include a second axially extending cylindrical projection 152 through which the respective second apertures 148 extend. The second projections 152 extend in a direction opposite the first projections 150, and thus in a rearwardly direction away from the rear surfaces 144 of the spring housings 141. The second projection 152 preferably include axial slits 155 for permitting radial flexibility. The second projections 152 each further include a second annular slot 153 adjacent respective rear surfaces 144 of the spring housings 141. It will be appreciated that the hub cover fasteners 41 extend through the second apertures 148 and the second projections 152 to connect the hub cover 40 to the support portion 30 and also to prevent rotation of the spring housings 141 relative the support portion 30 about the first apertures 147.

Figure 5:
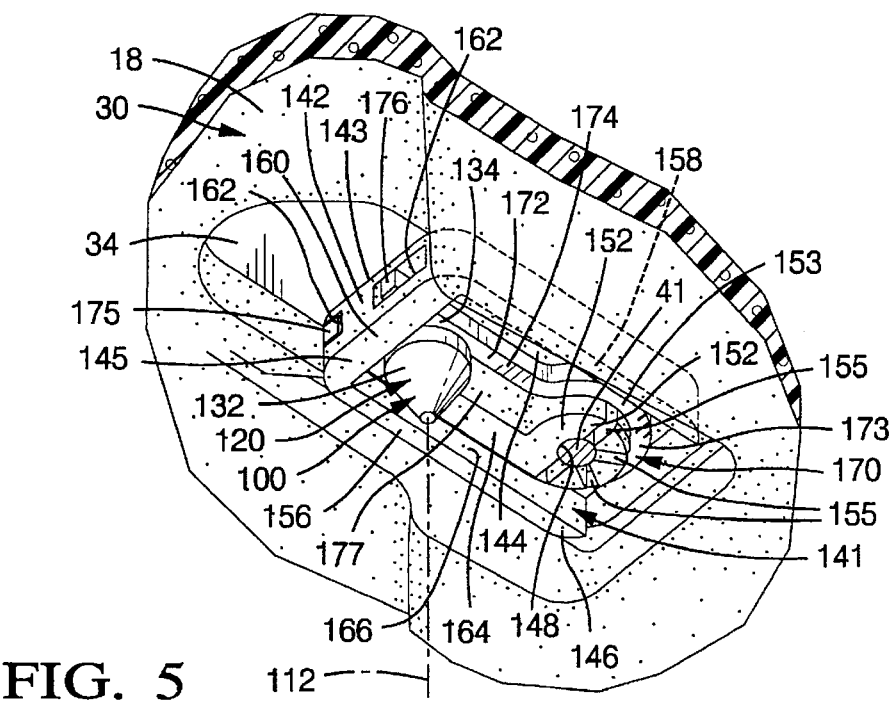
FIG. 5 is an enlarged perspective view of a spring housing on the steering wheel assembly.

As best shown in FIG. 5, the spring housings 141 each further include first and second laterally spaced apart opposing and radially extending side walls 156,158 projecting rearwardly away from the rear surface 144 along the entire radial length of the spring housings 141. The second portions 146 of the spring housings 141 each include an end wall 160 at an inboard end 142 of the spring housings 141. The end walls 160 are spaced apart rearwardly from the rear surfaces 144 and extend between and normal to the first and second side walls 156, 158. The end walls 160, first and second side walls 156, 158, and the rear surfaces 144 of the spring housings 141 cooperatively define end slots 162 on each outboard end 142 of the spring housings 141. The spring housings 141 each include a rearwardly projecting portion 164 extending generally radially between the second projections 152 and the end walls 160 and parallel to and laterally spaced apart from the first side wall 156 to define a radially extending alley 166 on each of the spring housings 141.

As best shown in FIG. 5, the spring housings 141 are each adapted to house a resilient member being a hairpin-shaped retainer spring 170 having a first leg 171 and a second leg 172 and wherein the legs 171, 172 are substantially parallel to each other and joined at outboard leg ends by a curved portion 173. The second legs 172 of each of the springs 170 include an intermediate release portion 174 for releasing the assembled spring 170 from the second mounting members 120, as described further hereinafter. The first and second legs 171,172 each include first and second free ends 175, 176, respectively, opposite the curved portion 173.

Each of the springs 170 is assembled to each of the spring housings 141 as follows. The first leg 171 of the spring 170 is placed in the alley 166 of the spring housing 141 and the first and second free ends 175,176 of the spring 170 are transversely slid into the end slots 162. Then, the curved portion 173 of the spring 170 is snap-fittedly pushed forwardly around the second projection 152 to be seated in the second annular slot 153 located thereon. Thus the entire spring 170 is mounted adjacent the rear surface 144 of the spring housing 141 with the free ends 175,176 of the legs 171,172 trapped in the end slots 162 to prevent excessive movement of the legs 171,172 in a longitudinal direction when the second mounting members 120 are latched by insertion therebetween, as described further below.

When the springs 170 are snapped into the spring housings 141, the spring housings 141 securely hold the springs 170 in position relative the support portion 30 of the steering wheel 12. The first and second legs 171,172 extend radially relative the module 50 and are positioned such that they traverse across respective support apertures 36 in the support portion 30 and first apertures 147 in the spring housings 141 to ensure that the legs 171,172 latch the distal ends 132 of the second mounting members 120 as the module 50 is moved into association with the support portion 30 and mounted to the steering wheel 12. Further, the springs 170 are preferably formed of a resilient metallic material such that the springs 170 are resiliently yieldable in a lateral direction, transverse to the longitudinal direction to permit insertion of the distal ends 132 of the second mounting members 120 through the support apertures 36 and first apertures 147 and past the legs 171,172 of the springs 170 as facilitated by the tapered configuration of the distal ends 132.

When the entire air bag module 50, and thus the second mounting members 120 are moved in the longitudinally rearward direction towards the front side 32 of the support portion 30 and through the support apertures 36 and first apertures 147 of the spring housings 141, the legs 171,172 of the springs 170 will move laterally outwardly until they are aligned with the annular grooves 134 in the distal ends 132, at which time the legs 171,172 of the springs 170 will move laterally inwardly into latching engagement with the grooves 134. Once the springs 170 are engaged with the grooves 134 of the second mounting members 120, the entire module 50 is securely attached to the support portion 30 of the steering wheel 12.

It will be appreciated that in the preferred embodiment, the module 50 remains in a fixed position relative the support portion 30 of the steering wheel 12 and is securely mounted thereto for normal vehicle use and air bag inflation. Consequently, a membrane switch horn (not shown) is preferably positioned within the cover 76 for actuation of a horn. However, it will be appreciated that the grooves 134 on the second mounting members 120 could be elongated in the longitudinal direction and compression springs and horn contacts (not shown) could be provided between the inflator flange 96 and the support portion 30 to provide a movable module with a floating-type horn.

The access openings 45 in the hub cover 40 are matably alignable with the intermediate release portions 174 of the legs 171,172 located outboard of the outer column diameter 28. The access openings 45 in the hub cover 45 provide access to a release space 177 defined between each intermediate release portion of the second legs 172 of the springs 170 and each rearwardly projecting portion 164 of the spring housings 141.

Disassembly of the air bag module 50 from the support portion 30 is easily accomplished as follows. The steering wheel 12 is released by use of the ignition key and is rotated until at least one of the access openings 45 in the hub cover 40 is no longer covered by the shroud 48. A suitable tool, such as flat blade screwdriver (not shown), may then be inserted through the access openings 45 in the hub cover 40 wherein the blade of screwdriver is received within the spaces 177 provided in the spring housings 141 and the screwdriver is then rotated. Rotation of the screwdriver blade within the spaces 177 causes the blade to contact the second legs 172 of the springs 170 and the rearwardly projecting portions 164 opposite from the second legs 172 to thereby bias the second leg 172 laterally outward and then also rearwardly such that the legs 171, 172 of the springs 170 pop out of engagement with the grooves 134 in the second mounting members 120. In this manner, the steering wheel 12 may be rotated and each of the springs 170 may be released from each of the grooves 134 of the second mounting members 120 such that the module 50 can be pulled forwardly and away from the support portion 30 for disassembly from the steering wheel 12.

Advantageously this outboard release arrangement utilizing spring housings 141 and resilient members being hairpin-shaped springs 170 easily permits rear release of the second mounting members 120 to permit removal of the module 50, while permitting the first and second mounting members 110, 112 to be located inboard of the outer column diameter 28 or otherwise blocked from the rear of the module 50. It will be appreciated that this outboard rear release arrangement is advantageous since the air bag module 50 may be removed from the steering wheel 12 without removing the hub cover 40, support portion 30, or any other components of the steering wheel 12 to service the module 50. Also advantageously this outboard rear release arrangement provides theft deterrence since the shroud 48 always blocks at least one of the access openings 45 in the hub cover 40 regardless of the position of the steering wheel 12 when the vehicle is parked.

Upon actuation, the inflator 90 discharges inflator gas. The ports 92 of the inflator 90 direct the discharging inflator gas upwardly to inflate the air bag 80 which will deploy out through the cover 76 in a well-known manner. During the application of the forces associated with the discharge of inflator gas, the second mounting members 120 securely retain the mouth portion 84 of the air bag 80, the air bag retainer 60, the base plate 70 and the inflator 90 in position relative each other while simultaneously holding the entire module 50 securely connected to and in position relative the steering wheel 12.

It will be understood that a person skilled in the art may make modifications to the preferred embodiment shown herein within the scope and intent of the claims.

Although the steering wheel 12 in the preferred embodiment has two spoke portions 20, it will be appreciated that any number of spoke portions 20 may be utilized. Preferably, the number of second mounting members 120 and spring housings 141 corresponds to the number of spoke portions 120. However, it is contemplated that the numbers need not be equal. It is also contemplated that the features of the springs housings 141 could be formed integrally with the support portion 30 or the hub portion 18 such that the springs 170 could be directly mounted thereto.

Although the support portion 30 is shown on the steering wheel 12, it will be appreciated that the support portion 30 having support apertures 36 and having the spring housings 141 mounted thereto may be located at any location on the vehicle, such as within a vehicle door or seat. It will further be appreciated that the lengths of the spring housings 141 and springs 170 in the outboard direction may be extended out to any outboard length such that the spring legs 171,172 have releasable portions 174 at a location spaced outboard of the module 50 to permit easier access to release the springs 170 to permit disassembly of the module 50 from the support portion 30. Although the preferred embodiment shows the steering column 14 blocking access for releasing the springs 170 from the second mounting members 120, it will be appreciated that other vehicle structure such as components in the door or seat may block access for release and require the use of the spring housings 141 and springs 170 on the support portion 30. It will further be appreciated that the rear access openings 45 located in the hub cover 45 are exemplary, and access openings 45 may be appropriately located through any vehicle structure which blocks access to the release portions 174 of the legs 171,172 of the springs 170.

While the preferred embodiment utilizes a base plate 70 interposed between the air bag retainer 60 and the inflator flange 96, it will be appreciated that the base plate 70 may be eliminated since the retaining and mounting mechanisms 100 have first mounting members 110 rigidly secured to the air bag retainer 60, instead of the base plate 70 as in the prior art. Thus, the air bag 80, air bag retainer 60, and inflator flange 96 may be simultaneously securely connected to the air bag retainer 60 by the second mounting members 120 and then snapped onto the support portion 30. It will be appreciated that the mechanisms 100 enable the air bag retainer 60, being made of a sufficiently rigid material, to be used to anchor the module 50, instead of the base plate 70 as in the prior art. When the base plate 70 is not utilized, the cover 76 would preferably be mounted to the inflator flange 96.

While the present invention has been described as carried out in a specific embodiment thereof, it is not intended to be limited thereby but is intended to cover the invention broadly within the scope and spirit of the appended claims.

The embodiments of the invention in which an exclusive property or privilege is claimed are defined as follows:

1. An air bag module for mounting to a support portion of a vehicle, the module comprising:

an air bag having an air bag opening;

an air bag retainer positioned around the air bag opening;

an inflator for discharging gas into the air bag opening to inflate the air bag, the inflator including an outwardly extending inflator flange;

an axially elongated first mounting member having an upper portion mounted to the air bag retainer and having a rearwardly extending portion extending through the air bag and the inflator flange;

an axially elongated second mounting member having an internal axial bore therethrough for securely engaging the rearwardly extending portion of the first mounting member therein, the second mounting member having a retaining surface extending radially outward from the bore and abutting the inflator flange when the first mounting member is fully engaged within the second mounting member;

the first mounting member and the air bag retainer being movable relative the air bag and inflator when the second mounting member is partially engaged with the first mounting member, the air bag and inflator flange being securely trapped between the retaining surface and the air bag retainer when the second mounting member is fully engaged with the first mounting member to simultaneously securely connect the air bag, inflator, and air bag retainer together and to fixedly position the air bag, air bag retainer and inflator relative each other; and the second mounting member having a distal end opposite the retaining surface and adapted for connection to the support portion of the vehicle to hold the module in position relative the vehicle.

2. The module of claim 1 wherein the module includes an outer module perimeter and a rear side being inaccessible when the module is mounted to the support portion of the vehicle, and a resilient member for holding the distal end of the second mounting member in position relative the support portion, the resilient member including a latching portion adapted for snap-fitted engagement with the distal end, the latching portion being located rearward the module and inboard of the outer module perimeter, and the resilient member including a release portion for releasing the distal end, the release portion being located rearward the module and outboard the outer module perimeter whereby the distal end of the second mounting member is releasable rearward of the module despite inaccessibility of the rear side of the module.

3. An air bag module for mounting to a support portion of a vehicle, the module comprising:

an air bag including an air bag opening;

an air bag retainer positioned around the air bag opening;

an inflator for discharging gas into the air bag opening to inflate the air bag, the inflator including an outwardly extending inflator flange;

a plurality of axially elongated first mounting members each having an upper portion rigidly secured to the air bag retainer and each having a rearwardly extending threaded shank portion extending through the air bag and the inflator flange;

a plurality of axially elongated second mounting members each having an internally threaded axial bore extending partially therethrough for threadably engaging respective threaded shank portions of the first mounting members therein, the second mounting members each having a retaining surface extending radially outward from the bore and abutting the inflator flange when the first mounting members are fully threadably engaged within the second mounting members;

the first mounting members and the air bag retainer being movable relative the air bag and inflator when the second mounting members are partially threadably engaged with the first mounting members, the air bag and inflator flange being securely trapped between the retaining surfaces and the air bag retainer when the second mounting members are fully threadably engaged with the first mounting members to simultaneously securely connect the air bag, inflator, and air bag retainer together and to fixedly position the air bag, air bag retainer and inflator relative each other; and the second mounting members each having a distal end opposite the retaining surface and adapted for snap-fitted connection to the support portion of the vehicle to hold the module in position relative the vehicle.

4. The module of claim 3 wherein the module includes a base plate interposed between the inflator flange and the air bag retainer and wherein the first mounting members extend through the base plate and wherein the first mounting members and the air bag retainer are movable relative the air bag, base plate and inflator when the second mounting members are partially threadably engaged with first mounting members and wherein the air bag, base plate and inflator flange are securely trapped between the retaining surfaces and the air bag retainer when the second mounting members are fully threadably engaged with the first mounting members to simultaneously securely connect the air bag, base plate, inflator, and air bag retainer together and to fixedly position the air bag, air bag retainer, base plate and inflator relative each other.

5. The module of claim 4 wherein the air bag, air bag retainer, base plate and inflator flange each include a plurality of air bag apertures, air bag retainer apertures, base plate apertures and inflator flange apertures, respectively, and wherein the air bag apertures, air bag retainer apertures, base plate apertures and inflator flange apertures are axially aligned and wherein the first mounting members extend through respective aligned air bag apertures, air bag retainer apertures, base plate apertures, and inflator flange apertures.

6. The module of claim 3 wherein the module includes an outer module perimeter and a rear side being inaccessible when the module is mounted to the support portion, and resilient members for holding the distal ends of the second mounting members in position relative the support portion, the resilient members including latching portions for snap-fitted engagement with the distal ends, the latching portions being located rearward the module and inboard of the outer module perimeter, and the resilient members including release portions for releasing the distal ends from the latching portions, the release portions being located rearward the module and outboard the outer module perimeter whereby the distal ends of the mounting members are releasable rearward of the module despite inaccessibility of the rear side of the module.

7. A mechanism mounting an air bag module to a vehicle, the module including a rear side and an outer module perimeter, the mechanism and module comprising:

a support portion on the vehicle having a front face and an opposite rear face, the support portion including apertures therethrough;

mounting members attached to the module and extending rearwardly away from the rear side of the module, the mounting members including distal ends insertable through the apertures when the module is moved towards the front face of the support portion, the rear side of the module being inaccessible when the distal ends are inserted through the apertures;

resilient members mounted to the rear face of the support portion, the resilient members including latching portions for snap-fittedly engaging the distal ends of the mounting members when inserted through the apertures to securely mount the module to the support portion, the latching portions being positioned inboard the outer module perimeter; and the resilient members including release portions for releasing the distal ends from the latching portions, the release portions being located rearward the module and outboard the outer module perimeter whereby the distal ends of the mounting members are releasable rearward of the module despite inaccessibility of the rear side of the module.

8. A mechanism mounting an air bag module to a vehicle, the module including a rear side and an outer module perimeter, the mechanism and module comprising:

a support portion disposed on the vehicle;

mounting members attached to the module and extending rearwardly away from the rear side of the module, the mounting members including distal ends secured to the support portion, the rear side of the module being inaccessible when the distal ends are secured to the support portion;

resilient members mounted on the support portion, the resilient members including latching portions for snap-fittedly engaging the distal ends of the mounting members when secured to the support portion, the latching portions being positioned inboard the outer module perimeter; and the resilient members including release portions for releasing the distal ends from the latching portions, the release portions being located rearward the module and outboard the outer module perimeter whereby the distal ends of the mounting members are releasable rearward of the module despite inaccessibility of the rear side of the module.

\* \* \* \* \*